(12) United States Patent
Cullen et al.

(10) Patent No.: US 7,771,313 B2
(45) Date of Patent: *Aug. 10, 2010

(54) VEHICLE TRAJECTORY CONTROL SYSTEM

(75) Inventors: Michael J. Cullen, Northville, MI (US);
Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/415,703

(22) Filed: Mar. 31, 2009

(65) Prior Publication Data

US 2009/0192684 A1  Jul. 30, 2009

Related U.S. Application Data

(60) Continuation of application No. 11/382,223, filed on May 8, 2006, now Pat. No. 7,510,504, which is a division of application No. 10/751,079, filed on Jan. 2, 2004, now Pat. No. 7,207,924, which is a continuation-in-part of application No. 09/669,443, filed on Sep. 26, 2000, now Pat. No. 6,945,910.

(51) Int. Cl.
*B60W 10/04* (2006.01)
(52) U.S. Cl. ........................ 477/107; 477/111
(58) Field of Classification Search ............. 477/107, 477/109, 110, 111, 113

See application file for complete search history.

(56) References Cited

U.S. PATENT DOCUMENTS

| | | | |
|---|---|---|---|
| 4,463,822 A | 8/1984 | Tanigawa et al. |
| 4,468,987 A | 9/1984 | Miller |
| 4,481,844 A | 11/1984 | Ironside et al. |
| 4,660,672 A | 4/1987 | Katou |
| 4,747,326 A | 5/1988 | Braun |
| 4,834,045 A | 5/1989 | Imai et al. |
| 4,854,283 A | 8/1989 | Klyono et al. |
| 4,879,657 A | 11/1989 | Tamura et al. |
| 4,938,102 A | 7/1990 | Leising et al. |
| 4,975,845 A | 12/1990 | Mehta |

(Continued)

FOREIGN PATENT DOCUMENTS

DE          3918254        12/1989

(Continued)

*Primary Examiner*—Roger Pang
(74) *Attorney, Agent, or Firm*—Allan J. Lippa; Alleman Hall McCoy Russell & Tuttle LLP

(57) ABSTRACT

A system, comprising an engine having an electronically controlled throttle plate to adjust airflow to the engine; a transmission having an input speed and an output speed, the transmission including a clutch and the transmission coupled to the engine; and a controller configured to: during a tip-out condition and during a gear ratio change to a future gear, and when the transmission does not provide engine braking, control the engine speed to a synchronous speed in the future gear ratio by adjusting an engine operating parameter so that the engine speed is close to the engine speed that will be achieved after the gear change is completed, and maintain engine speed at the close engine speed after the gear change is completed until a tip-in, where engine speed is controlled by adjusting at least the electronically controlled throttle plate.

5 Claims, 15 Drawing Sheets

U.S. PATENT DOCUMENTS

| | | | |
|---|---|---|---|
| 5,002,028 A | 3/1991 | Arai et al. | |
| 5,003,483 A | 3/1991 | Hedstrom | |
| 5,019,939 A | 5/1991 | Reimer | |
| 5,078,109 A | 1/1992 | Yoshida et al. | |
| 5,088,043 A | 2/1992 | Akishino et al. | |
| 5,096,015 A | 3/1992 | Akishino et al. | |
| 5,113,721 A | 5/1992 | Polly | |
| 5,113,820 A | 5/1992 | Flaig | |
| 5,123,389 A | 6/1992 | Togai et al. | |
| 5,193,657 A | 3/1993 | Iizuka | |
| 5,233,530 A | 8/1993 | Shimada et al. | |
| 5,241,855 A | 9/1993 | Cullen et al. | |
| 5,351,776 A | 10/1994 | Keller et al. | |
| 5,389,051 A | 2/1995 | Hirate et al. | |
| 5,400,865 A | 3/1995 | Togai et al. | |
| 5,441,464 A | 8/1995 | Markyvech | |
| 5,445,576 A | 8/1995 | Motamedi et al. | |
| 5,492,094 A | 2/1996 | Cullen et al. | |
| 5,520,594 A | 5/1996 | Fukasawa et al. | |
| 5,537,894 A | 7/1996 | Chan | |
| 5,562,571 A | 10/1996 | Maruyama et al. | |
| 5,625,558 A | 4/1997 | Togai et al. | |
| 5,651,752 A | 7/1997 | Wakahara et al. | |
| 5,662,085 A | 9/1997 | Aubourg et al. | |
| 5,673,668 A | 10/1997 | Pallett et al. | |
| 5,692,472 A | 12/1997 | Bederna et al. | |
| 5,733,219 A | 3/1998 | Rettig et al. | |
| 5,799,262 A | 8/1998 | Suzuki | |
| 5,816,979 A | 10/1998 | Shiiba et al. | |
| 5,875,759 A | 3/1999 | Meyer et al. | |
| 5,902,210 A | 5/1999 | Kobayashi et al. | |
| 5,921,883 A | 7/1999 | Bellinger | |
| 5,921,886 A | 7/1999 | Takada et al. | |
| 5,934,247 A | 8/1999 | Hashimoto et al. | |
| 5,957,994 A | 9/1999 | Meyer et al. | |
| 5,999,875 A | 12/1999 | Bruedigam et al. | |
| 6,019,699 A | 2/2000 | Hoshiya et al. | |
| 6,024,669 A | 2/2000 | Iwatsuki et al. | |
| 6,039,023 A | 3/2000 | Cullen et al. | |
| 6,078,859 A | 6/2000 | Jastrzebski et al. | |
| 6,078,860 A | 6/2000 | Kerns | |
| 6,102,831 A | 8/2000 | Wakahara et al. | |
| 6,236,929 B1 | 5/2001 | Sen et al. | |
| 6,269,293 B1 | 7/2001 | Correa et al. | |
| 6,304,809 B1 | 10/2001 | Cullen et al. | |
| 6,308,125 B1 | 10/2001 | Gleason et al. | |
| 6,338,392 B1 | 1/2002 | Schmitt | |
| 6,376,927 B1 | 4/2002 | Tamai et al. | |
| 6,432,025 B1 | 8/2002 | Kondo et al. | |
| 6,497,637 B2 | 12/2002 | Takao et al. | |
| 6,516,778 B1 | 2/2003 | Tamai et al. | |
| 6,740,005 B2 | 5/2004 | Watanabe et al. | |
| 7,510,504 B2 * | 3/2009 | Cullen et al. | 477/107 |

FOREIGN PATENT DOCUMENTS

| | | |
|---|---|---|
| EP | 0429646 | 4/1994 |
| EP | 0441961 | 5/1994 |
| GB | 2299144 | 9/1996 |
| GB | 2313425 | 11/1997 |
| GB | 2318556 | 4/1998 |
| GB | 2350156 | 11/2000 |
| JP | 3288056 | 12/1991 |
| JP | 6094122 | 4/1994 |
| JP | 8270774 | 10/1996 |

* cited by examiner

Two-Circuit Unlock Converter Clutch (Disengaged)

Two-Circuit Lockup Converter Clutch (Engaged)

VEHICLE TRAJECTORY CONTROL SYSTEM

CROSS REFERENCE TO RELATED APPLICATIONS

The present application is continuation of U.S. patent application Ser. No. 11/382,223, filed May 8, 2006, which is a divisional of U.S. patent application Ser. No. 10/751,079, filed Jan. 2, 2004, which is a continuation-in-part of U.S. patent application Ser. No. 09/669,443, filed Sep. 26, 2000, now U.S. Pat. No. 6,945,910, entitled "Vehicle Trajectory Control System", naming Michael John Cullen and Ralph Wayne Cunningham as inventors, the entire contents of each of which are incorporated herein by reference for all purposes.

BACKGROUND OF THE INVENTION

1. Field of the Invention

The present invention relates to a system and method to control a powertrain of a vehicle, and in particular powertrain control during vehicle deceleration.

2. Background of the Invention

Transmissions are known that have over-running, or one-way clutches. In some applications, these clutches are used to enable certain types of vehicle shifts such as so-called non-synchronous gear changes. In some cases, the transmission input speed is less than the synchronous speed of the selected gear during situations in which the clutch is overrunning. To prevent such situations, an electric motor, coupled to the transmission through a torque synthesizing/distributing unit, is used to maintain the gear input speed at or near the synchronous speed. The torque synthesizing/distributing unit is an additional unit that has planetary gear sets and several clutches. Such a system is described in U.S. Pat. No. 6,019,699.

The inventors herein have recognized a disadvantage with the above approach. In particular, such a method uses an electric motor, which is not available on the majority of mass production vehicles. Adding such a motor can be a significant additional cost to the customer. Further, the above method also uses an additional torque synthesizing/distributing unit. This additional device adds further to the cost of the vehicle.

SUMMARY OF THE INVENTION

The disadvantages of prior approaches are overcome, in one example embodiment, by a method for controlling an engine coupled to a transmission having an input speed and an output speed. The method comprises: during a tip-out condition and during a gear ratio change to a future gear, controlling the engine speed to a synchronous speed in the future gear ratio by adjusting an engine operating parameter so that the gear change can be performed with the engine speed close to the engine speed that will be achieved after the gear change is completed.

By adjusting an engine operating parameter to control the speed to a synchronous speed, it is possible to prevent tip-in torque shock, without the additional cost of an electric motor and an addition torque synthesizing/distributing unit. Further, it is possible to obtain improved performance upon a driver tip-in.

Advantages of the present invention are improved driveability and reduced cost.

It is important to note that various parameters can be used to indicate transmission output speed such as, for example, vehicle speed or output shaft speed. Further various engine operating parameters can be used such as, for example, engine airflow, engine torque, ignition timing, engine air/fuel, and various others.

DETAILED DESCRIPTION

Figure 1:
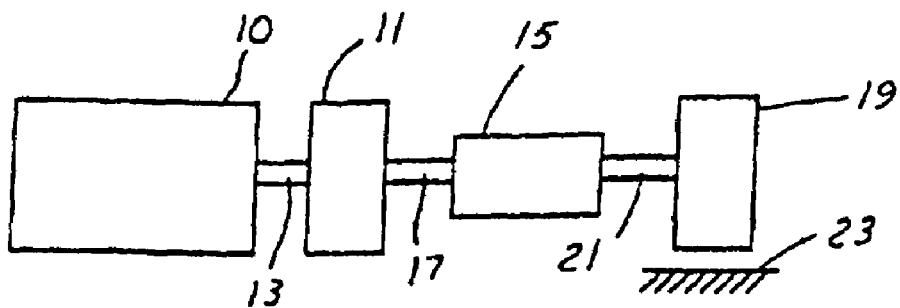
FIGS. 1-2 are block diagrams of an embodiment wherein the invention is used to advantage.
Figure 2:
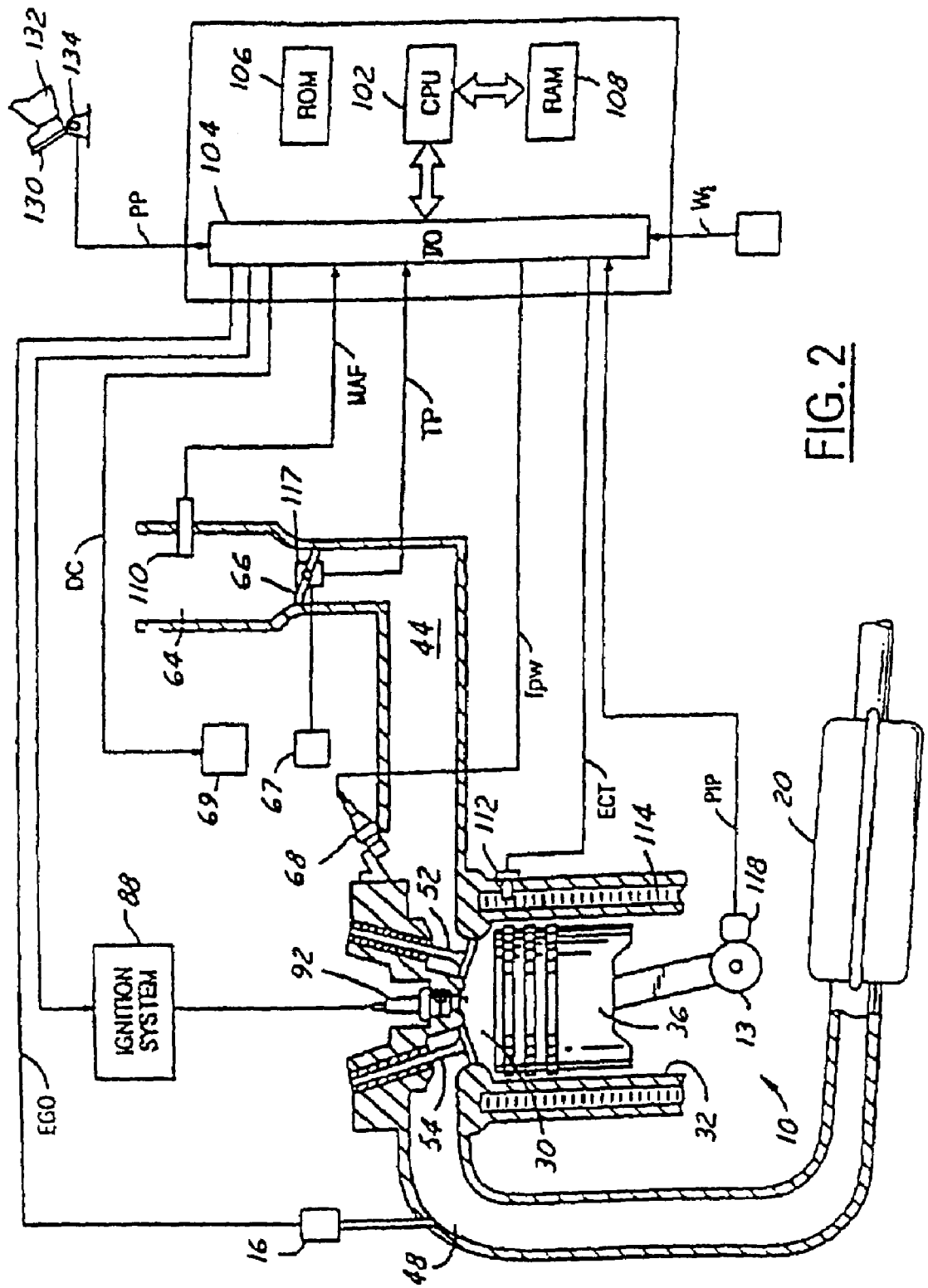

Referring to FIG. 1, internal combustion engine 10, further described herein with particular reference to FIG. 2, is shown coupled to torque converter 11 via crankshaft 13. Torque converter 11 is also coupled to transmission 15 via transmission input shaft 17. Torque converter 11 has a bypass clutch (described in FIGS. 20-23), which can be engaged, disengaged, or partially engaged. When the clutch is either disengaged or partially engaged, the torque converter is said to be in an unlocked state. Transmission 15 comprises an electronically controlled transmission with a plurality of selectable discrete gear ratios. Transmission 15 also comprises various other gears such as, for example, a final drive ratio (not shown). Transmission 15 is also coupled to tire 19 via axle 21. Tire 19 interfaces the vehicle (not shown) to the road 23. In a preferred embodiment, transmission 15 has the following driver selectable options: park (P), reverse (R), neutral (N), driver (D), and low (L). The driver selects these positions via a transmission lever. In this preferred embodiment, the lever is known as the PRNDL lever, corresponding to the different options. In particular, in park or neutral, transmission 15 does not transmit torque from the transmission input to the output. In drive, a transmission controller can control transmission to select any available forward gear ratios. In reverse, a single reverse gear is selected. In low, only a lower set of forward gear ratios can be selected by the electronic controller. Those skilled in the art will recognize, in view of this disclosure, various other types of transmission levers with different sets of options that can be used with the present invention. For example, there can be low 1 and low 2 options. Also, the transmission lever may be located on a steering column or between driver and passenger seats.

Internal combustion engine 10 comprises a plurality of cylinders, one cylinder of which is shown in FIG. 2. Electronic engine controller 12 controls Engine 10. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

FIGS. 2-17 describe various routines carried out by controller 12. The routines are preferably carried out in the order in which they are numbered, unless called by an earlier routine. However, those skilled in the art will clearly recognize, in view of this disclosure that various aspects of the Figures and various calculations can be rearranged in numerous orders without departing from the scope of the invention.

Figure 3:
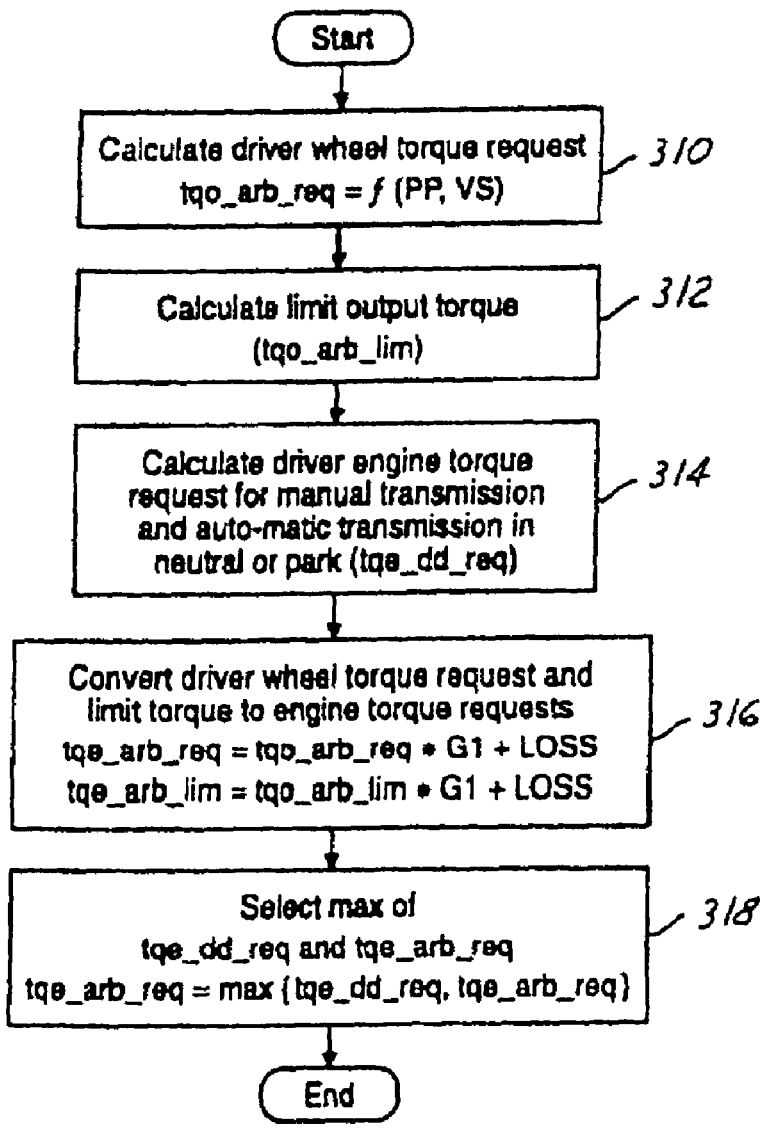
FIGS. 3-18 are high-level flow charts of various operations performed by a portion of the embodiment shown in FIG. 1.

Referring now to FIG. 3, a routine is described for determining the desired engine torque for use in the engine control system. First, in step 310, a driver requested wheel torque, or output shaft torque, is calculated based on pedal position and vehicle speed. In particular, the driver requested torque (tqo_arb_req) is calculated as a two-dimensional lookup table as a function of pedal position (PP) and vehicle speed (vspd). Next, in step 312, a limit torque (tqo_arb_lim) is determined. This limit output torque can be provided from various sources, for example, from vehicle speed limiting, traction control limiting, or from a vehicle stability control system. When the transmission controller provides the limit output torque, this torque can represent maximum allowable torque that can be transmitted through the transmission. Next, in step 314, the routine calculates a driver engine torque request for manual transmissions and automatic transmissions in neutral, park, or some driver selected gears (tqe_dd_req). Note that the tqe_dd_req is a separate parameter then the one calculated in step 310, when tqe_arb_req is calculated for automatic transmissions when the transmission is in a gear other then neutral or park. Next, in step 316, the routine converts driver wheel torque request and limit torque to engine torque request using overall ratio G1 (which includes gear ratio, torque converter torque ratio, transmission efficiency), and torque loss parameter LOSS, which preferably represent friction. Next, in step 318, the routine selects the maximum of the tqe_dd_req and tqe_arb_req. In this way, the routine arbitrates the proper engine torque request taking into account whether an automatic transmission or manual transmission is present in the vehicle. Further, the routine provides for automatic transmissions operated in a mode, such as neutral or park, when the engine is not coupled to drive the wheels.

Figure 4A:
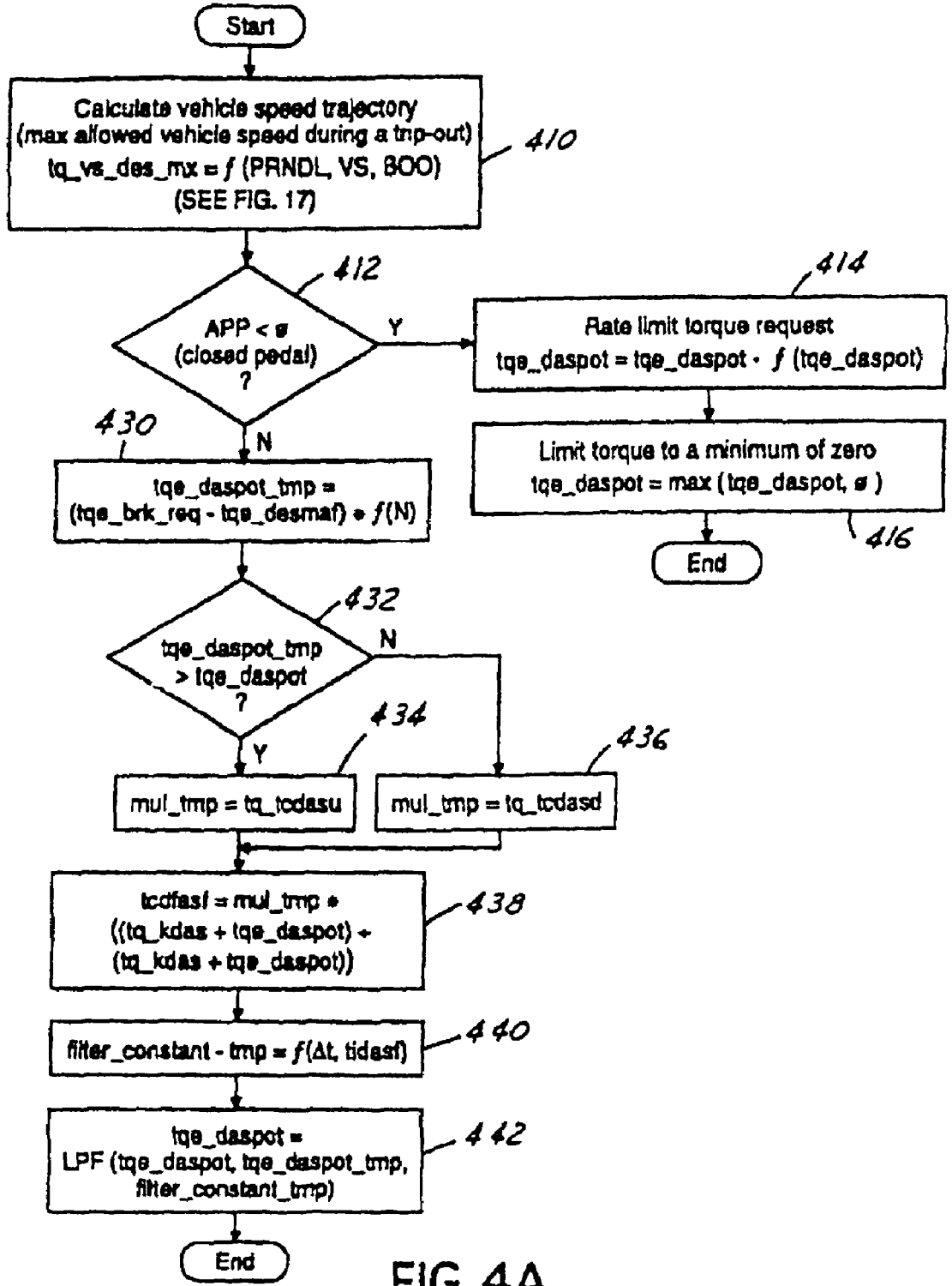

Referring now to FIGS. 4A and 4B, a routine is described which calculates a desired vehicle speed trajectory and which filters and limits the torque request to provide various advantages as described later herein. First, in step 410, a routine calculates the vehicle speed trajectory based on position of the gear selector (PRNDL), vehicle speed (vspd), and the brake pedal (BOO).

In particular, the routine calculates the maximum vehicle speed during a tip-out (tq_vs_des_mx). As described later herein, this vehicle speed trajectory is used to determine whether negative engine torque is required. Those skilled in the art will recognize, in view of this disclosure, that various other parameters can be used to provide a desired vehicle trajectory such as acceleration or deceleration. Alternatively, timers could be used to determine if a selected operating condition is achieved by a set time.

Continuing with FIG. 4A, the routine proceeds to step 412 where a determination is made as to whether the pedal position is at closed pedal. This is done, for example, by checking the flag APP. Flag APP is set to minus 1 when, for example, PP is less than a predetermined value indicated the driver has released their foot, or when the pedal angle is almost completely released. In other words, in this implementation, the routine determines whether the driver has positioned the pedal in the most released position, known to those skilled in the art as closed pedal. When the answer to step 412 is yes, the routine continues to step 414 where the desired engine torque is rate limited. Then, in step 416, the requested torque is limited to a minimum of zero. Parameter tqe_daspot represents the minimum clip on requested torque. The equation in step 414 provides a second order function, which is preferable for drive feel. Those skilled in the art will recognize, in view of this disclosure, that various filtering methods could be used, such as a first order low pass filter or a rate-limiting filter.

When the answer to step 412 is no, the routine continues to step 430 in FIG. 4b. In other words, when the driver is not in a closed pedal condition, which means in a part or wide-open pedal position, the routine calculates the rate limited torque as a portion of the difference between the current driver demand and the minimum allowed torque (tqe_desmaf) determined in part from the misfire line as described later herein. Next, in step 432, a determination is made as to whether temporary filtered torque (tqe_daspot_tmp) is greater then filtered desired torque (tqe_daspot). Depending on the outcome of step 432, a temporary multiplier is set. In particular, this temporary multiplier adjusts a filtering time constant for filtering engine torque. The filter constant is set to different levels depending on whether desired engine torque is increasing or decreasing. Step 434 sets the multiplier for an increase in torque. Step 436, sets the multiplier for a decrease in desired torque. Steps 438, 440, and 432 describe the details of how the desired engine torque is filtered. The time constant (tcdasf) is calculated in step 438. Then, the filter constant is calculated as a function of the sample time and the parameter (tcdasf). Finally, in step 442, the filtered desired engine torque is calculated with a low pass filter (LPF). Those skilled in the art will recognize, in view of this disclosure that various types of filters can be used rather than a low pass filter such as rate limiting filters, or lead lag filters.

Figure 5:
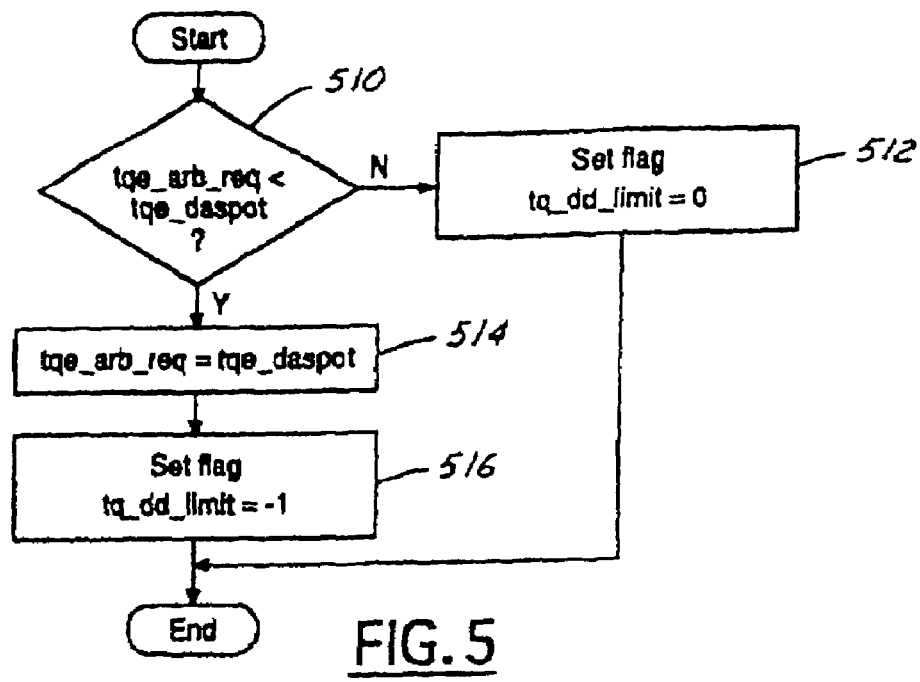

Referring now to FIG. 5, a routine is described which continues the determination of desired engine torque from FIGS. 4a and 4b. First, in step 510, a determination is made as to whether the requested engine torque from step 318 (tqe_arb_req) is less than the filtered desired engine torque (tqe_daspot). When the answer to step 510 is no, the routine continues to step 512 when a flag (tq_dd_limit) is set to zero. Otherwise, in step 514, the desired engine torque is set equal to the filtered engine torque. Next, in step 516, the flag (tq_dd_limit) is set to minus one. In this way, regardless of pedal angle, the filtered engine torque is applied as a minimum clip on the driver requested engine torque.

Figure 6:
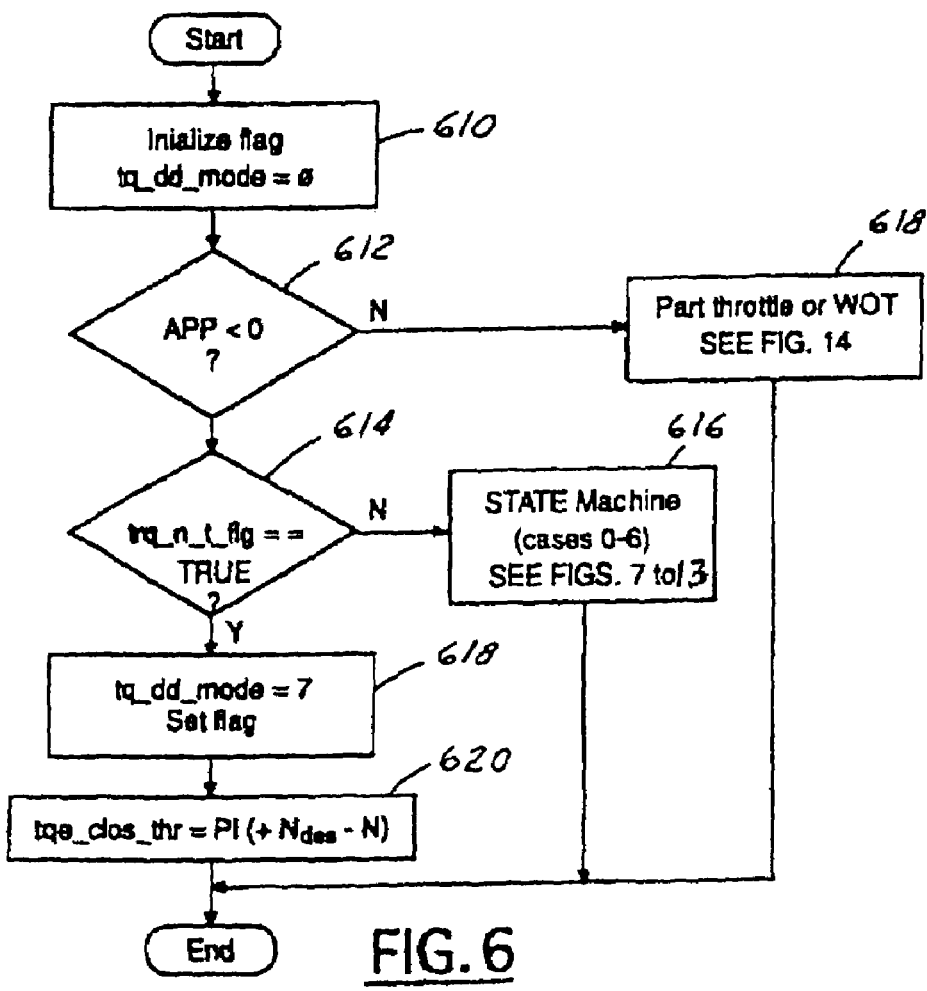

Referring now to FIG. 6, a routine is described for determining whether the driver is in a closed pedal position, wherein closed pedal engine and vehicle controls are executed. First, in step 610, a flag is initialized (tq_dd_mode=zero). This step is only executed at key-on or at part throttle conditions. This flag is used in the closed pedal state machine to determine which state is executed. As described later herein, the state machine operates from case zero up to case 6. The flag tq_dd_mode determines which case is executed.

In step 612, a determination is made as to whether a tip out condition is present via flag APP. In other words, a determination is made as to whether the measured accelerator pedal position is less than a predetermined value indicating the pedal is in the fully released position. Those skilled in the art will recognize, in view of this disclosure, various ways for determining whether a closed pedal, or tip-out condition, is present. For example, vehicle speed or acceleration, engine torque determination, or various other methods could be used.

Figure 14:
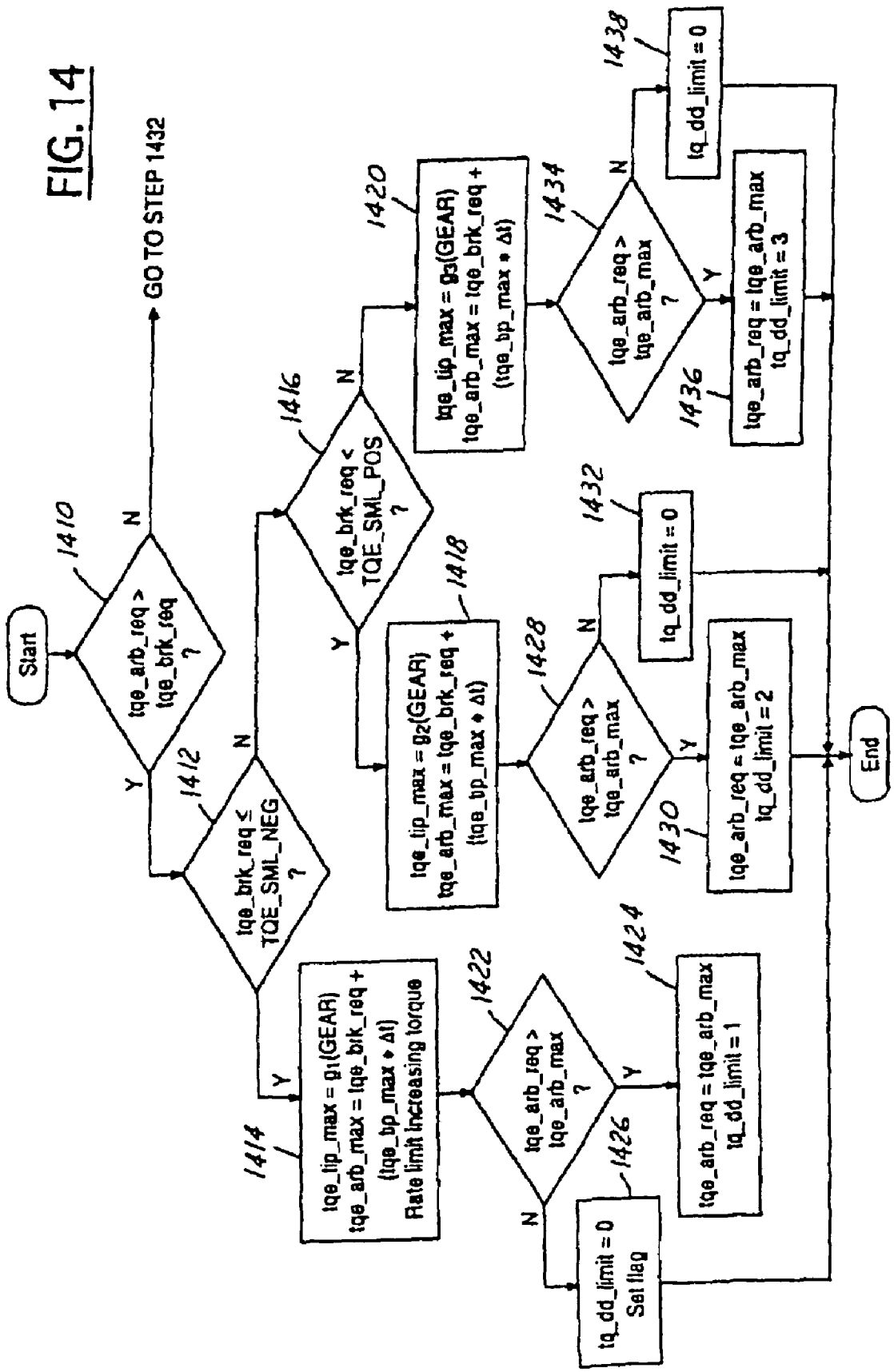

Continuing with FIG. 6, when the answer to step 612 is no, the routine determines that the condition is part throttle or wide-open throttle and executes the routine described in FIG. 14. When the answer to step 612 is yes, the routine continues to step 614, where a determination is made as to whether the flag trg_n_t_flg is TRUE. In other words, the routine determines whether the engine is in the feedback engine speed control mode. There are various places where the engine is in the closed loop engine speed control mode such as, for example, during a manual pull in when the transmission requests an engine speed to match the future gear ratio; when the current gear does not provide engine braking as described later herein; or during a neutral to drive engagement. For example, during a neutral to drive engagement or a manual pull in (where the driver changes the selected PRNDL position), the transmission can delay the actual gear change until the engine speed is brought to a desired engine speed. In these examples, the desired engine speed can be selected to equal the synchronous speed in the future gear ratio. In this way, transmission wear is minimized since the gear ratio can be performed with the engine speed close to the engine speed that will be achieved after the gear change is completed. In another example relating to when the current gear does not provide engine braking, the desired engine torque is calculated to that the transmission input speed is at, or slightly below, the measured transmission output speed times the current gear ratio of the transmission. In this way, there is no delay and transmission gear clunk is minimized when positive powertrain output torque is again applied. Stated another way, the desired engine speed can be set to (or slightly below) the synchronous speed, where the synchronous speed is based on the transmission state (selected gear ratio) and the transmission output speed. Such a method can be used when the current selected transmission ratio does not provide engine braking. In this speed control, as described later herein, a desired torque is selected to cause the speed error to approach zero. As described, torque control can be accomplished via various engine-operating parameters such as air/fuel, ignition timing, throttle angle, or any other available torque actuator.

When the answer to step 614 is no, the state machine is called and the case is executed which corresponds to the current condition of flag tq_dd_mode in step 616. Otherwise, the routine continues to 618 where the flag is set to 7. Then, the desired engine torque is calculated using a PI controller known to those skilled in the art as a proportional integral controller based on an engine speed error calculated from the difference between the desired engine speed (Ndes minus N).

Figure 7:
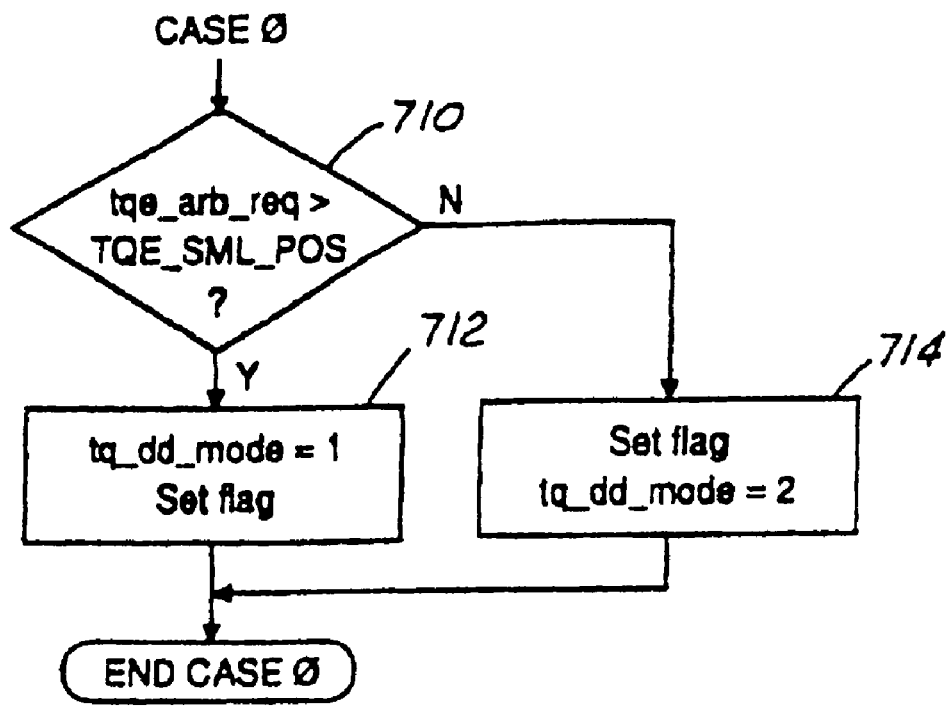

Referring now to FIG. 7, case zero of the state machine is described. Case zero is generally called to initialize the state machine. First, in step 710, a determination is made as to whether the requested arbitrated torque is greater than a small positive calibratable engine torque (TQE_SML_POS). When the answer to step 710 is yes, the state machine flag is set to 1 in step 712. Otherwise, the state machine flag is set to 2 in step 714.

Figure 8:
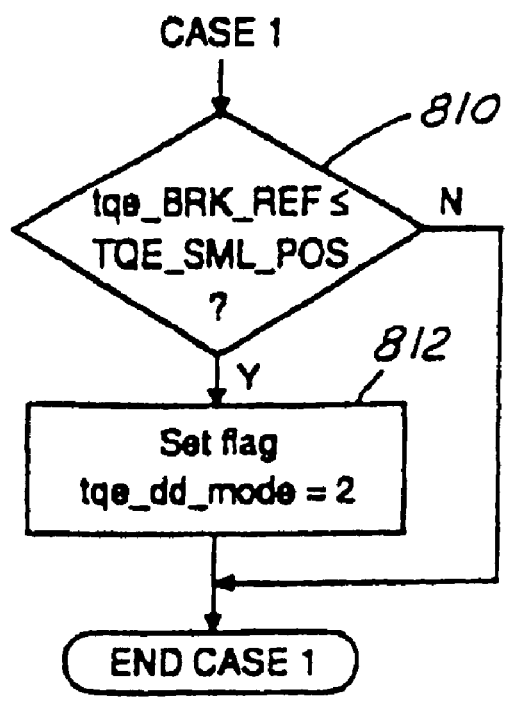

Referring now to FIG. 8, case 1 of the state machine is described. As described above, case 1 is called when flag tqe_dd_mode is equal to 1 in step 616. In step 810, a determination is made as to whether the desired engine torque is less than or equal to the calibratable small positive torque (TQE_SML_POS). When the answer to step 810 is yes, the flag tqe_dd_mode is set to 2 in step 812.

Figure 9:
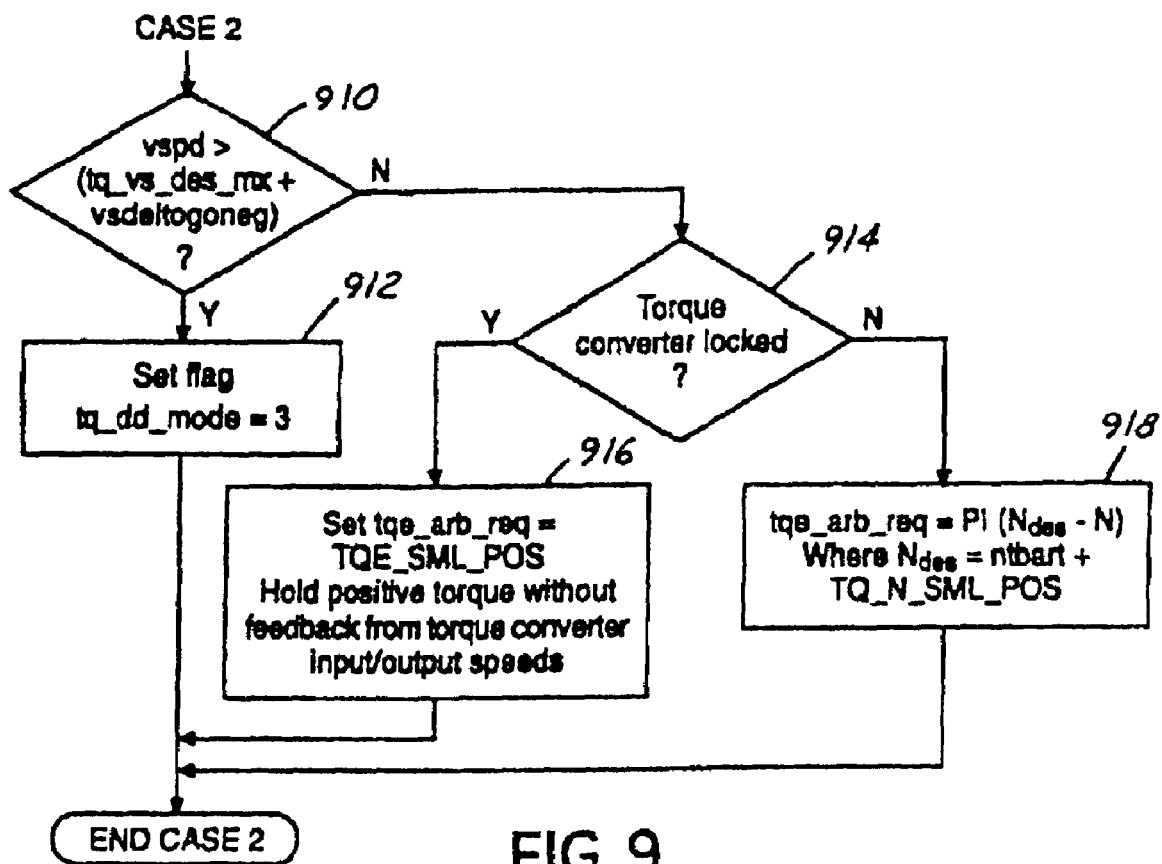

Referring now to FIG. 9, case 2 of the state machine is described. First, in step 910, a determination is made as to whether the current actual vehicle speed (vspd) is greater than the sum of the maximum allowed speed during the tip out condition (tq_vs_des_mx) plus the allowed over-speed error (vsdeltogoneg). The allowed over-speed error can be a single value or can vary with engine operating parameters. For example, depending on selected gear ratio and vehicle speed, it may be desirable to have different thresholds of allowed over-speed error. Such an approach may reduce excessive shifting, also known as shift busyness. When the answer to step 910 is yes, the state machine flag (tq_dd_mode) is set equal to 3. In other words, when the actual vehicle speed is greater than the desired vehicle speed trajectory, plus the tolerance value, the state machine then executes in the next call of step 616, case 3, which executes a torque crossing from positive powertrain output torque to negative powertrain output torque, as described later herein with particular reference to FIG. 10. As described above, those skilled in the art will recognize, in view of this disclosure, that various other vehicle parameters can be used to calculate the desired vehicle speed trajectory and determine if the actual vehicle trajectory is below the desired vehicle trajectory.

When the answer to step 910 is no, the routine continues to step 914, where a determination is made as to whether the torque converter is locked. When the answer to step 914 is no, the routine continues to step 918. In step 918, a positive output torque is provided including closed loop control using torque converter input and/or output speeds. In this particular case, a desired engine speed is calculated to be greater than the measured torque converter output or turbine speed. This desired engine speed is used with a closed loop proportional integral (PI) controller to calculate a desired engine torque request. In this way, feedback control is used to maintain a positive output torque. The parameter (TQ_N_SML_POS) is a calibratable parameter to provide a safety factor that minimizes inadvertent zero torque crossings due to external factors such as road grade. In other words, the controller's objective is to maintain engine speed greater than torque converter output speed. Those skilled in the art will recognize in view of this disclosure that additional feedback can be included, wherein such feedback could be from sensors such as a torque sensor, mass airflow sensor, or other sensors used in torque or speed control.

Alternatively, when the torque converter is locked, the desired arbitrated engine torque is set to the small positive torque (TQE_SML_POS). In this case, the powertrain is controlled to provide a positive output torque and minimize inadvertent transitions through the zero torque point. Since the torque converter is locked, an open loop control approach is used where feedback from torque converter input and output speeds based on a torque converter model are not used. However, other feedback variables can be used in providing the torque control such as, for example, a torque sensor or a mass airflow sensor. In particular, torque transmitted by the powertrain (engine output torque, transmission torque, or wheel torque) can be estimated based on operating conditions such as, for example, mass airflow, manifold pressure, engine speed, ignition timing, coolant temperature, and other operating conditions.

By providing such control of maintaining positive powertrain output, inadvertent zero torque crossings will be minimized and improved vehicle drive feel can be achieved.

Figure 10:
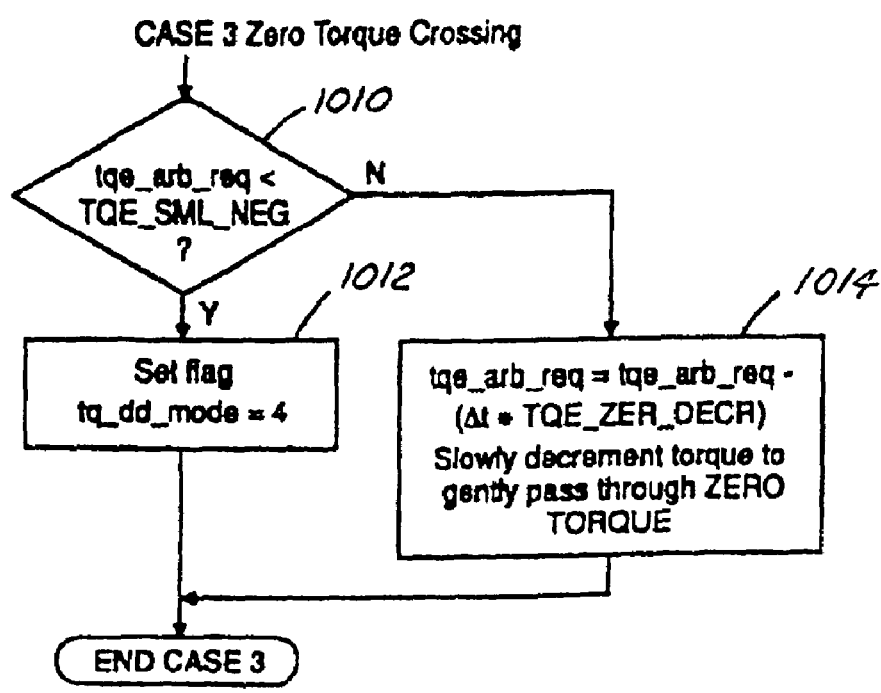

Referring now to FIG. 10, case 3 of the state machine is described. First, in step 1010, a determination is made as to whether the arbitrated requested engine torque is less than a small negative output torque (TQE_SML_NEG), or the small negative torque is a predetermined calibratable parameter. When the answer to step 1010 is yes, then the state machine flag tq_dd_mode is set to 4 in step 1012. Otherwise, in step 1014, the requested engine torque is slowly decremented to gently pass through the zero torque point. In this way, once the negative engine torque is provided, the routine will transition to case 4, and until the negative engine torque is provided, the routine will provide a gradual decrease from the small positive torque to the small negative torque so that clunk occurring at the zero torque point is minimized.

Figure 11:
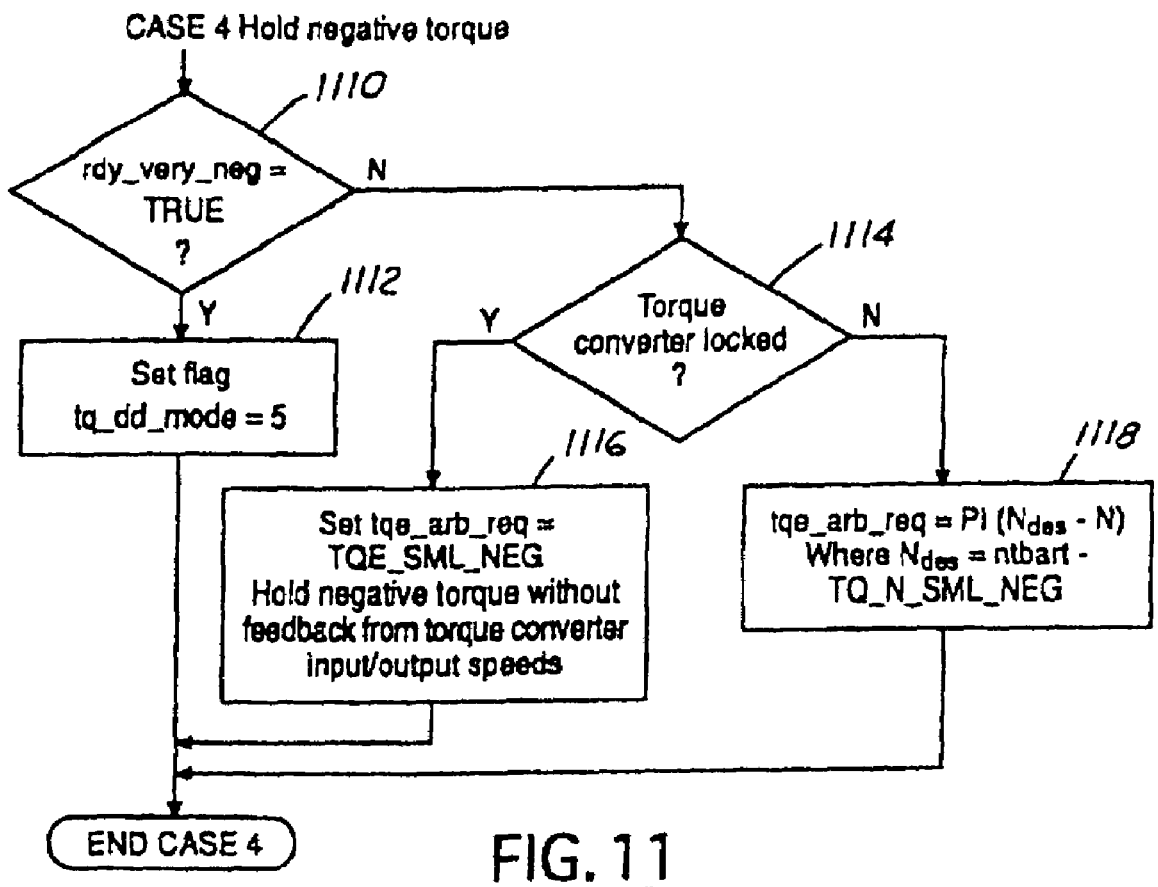

Referring now to FIG. 11, case 4 of the state machine is described. First, in step 1110, a determination is made as to whether a large negative engine torque is required by determining if flag (rdy_very_neg) is TRUE. Typically, the flag is set TRUE by the transmission control system to indicate that the torque converter is locked. In other words, various types of torque converters cannot be locked when the powertrain is transmitting large negative torques. Thus, the present invention can prevent large negative engine torques until the torque converter is locked, if such a torque converter is used. When the answer to step 1110 is yes, the state machine flag (tq_dd_mode) is set to 5 in step 1112. Otherwise, a determination is made as to whether the torque converter is locked in step 1114. When the torque converter is locked, the required engine torque is set to a small negative value (TQE_SML_NEG), which is predetermined calibratable value. In step 1116, the negative engine torque is provided in an open loop mode without feedback from the torque converter input and output speeds. Otherwise, in step 1118, closed loop engine speed control is provided where the desired engine speed is calculated to be slightly less than the torque converter output speed. Thus, in step 1118, feedback from the torque converter input speed and output speed is utilized to minimize inadvertent zero torque transitions.

Figure 12:
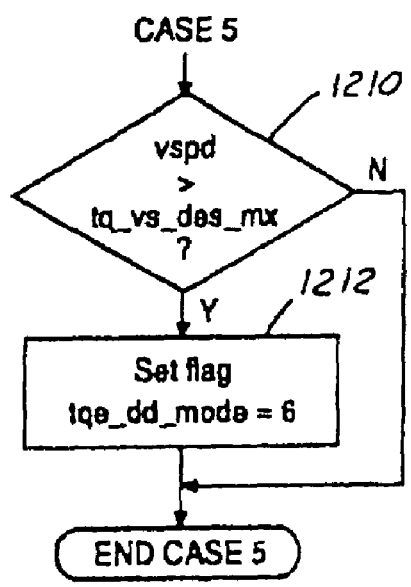

Referring now to FIG. 12, case 5 of the state machine is described. In step 1210, a determination is made as to whether the current vehicle speed (vspd) is greater than the maximum allowed vehicle speed trajectory value (tq_vs_des_mx). When the answer to step 1210 is yes, the routine continues to step 1212 where state machine flag (tq_dd_mode) is set to 6.

Figure 13:
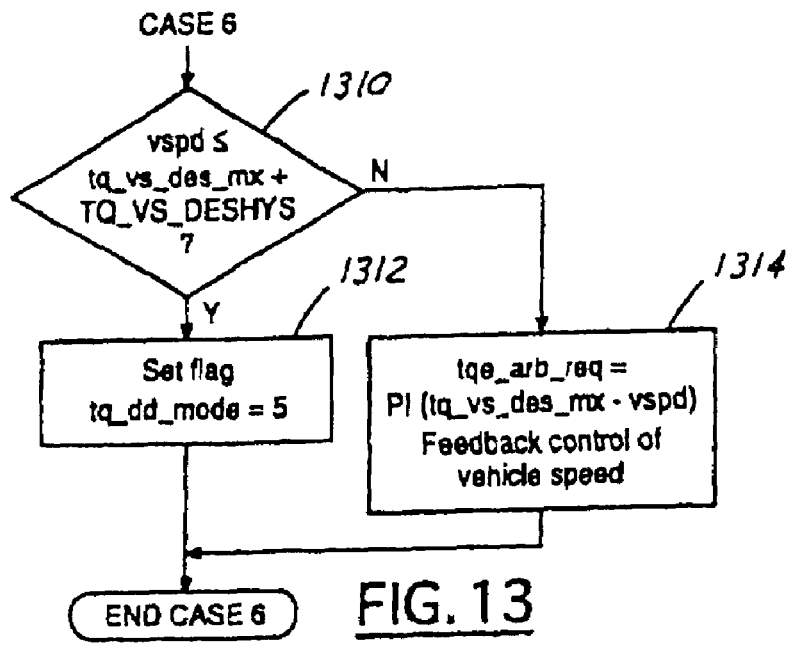

Referring now to FIG. 13, case 6 of the state machine is described. First, in step 1310, a determination is made as to whether measured vehicle speed (vspd) is less than equal to the desired vehicle speed trajectory plus a predetermined calibratable value (TQ_VS_DESHYS). When the answer to step 1310 is yes, the routine continues to step 1312 where the state machine flag (tq_dd_mode) is set to 5. Otherwise, the routine continues to step 1314 where feedback control vehicle speed is executed to provide the desired deceleration rate and the desired vehicle speed trajectory. In particular, a PI controller known to those skilled in the art as a proportional integral controller is used with the desired maximum allowed vehicle speed and the actual speed to calculate the desired engine torque. In this way, engine torque control is provided to give a desired vehicle trajectory.

If the state machine is called and none of the cases are executed, the default case is case zero.

Referring now to FIGS. 14a and 14b, a routine is described for rate limiting desired engine torque when desired powertrain output is increasing. In step 1410, a determination is made as to whether the desired engine torque is greater than the current requested engine torque. In other words, a determination is made as to whether the desired engine output is increasing. When the answer to step 1410 is yes, a determination is made in step 1412 as to whether the current engine requested torque is less than or equal to a small negative torque value (TQE_SML_NEG). When the answer to step 1412 is yes, the routine continues to step 1414, where the desired engine torque is rate limited at a first rate determined by function G1. In other words, when the desired engine torque is increasing but negative and less than a predetermined negative engine torque, the desired engine torque increasing rate is limited to a first predetermined rate, wherein the predetermined rate is dependent on the transmission gear selected or the current transmission gear ratio. When the answer to step 1412 is no, the routine continues to step 1416, where a determination is made as to whether the current requested engine torque is less than a small positive calibratable value (TQE_SML_POS). In other words, a determination is made as to whether the current requested engine torque is near the zero torque point. When the answer to step 1416 is yes, the routine continues to step 1418, where the desired engine torque increasing rate is limited based on function G2. Generally, the maximum allowed rate of increase of engine torque in this region (near the zero torque point) is less than the allowed increasing engine torque rate outside of this region. When the answer to step 1416 is no, the routine continues to step 1420, where engine torque increasing rate is limited to a third predetermined rate based on function G3. Stated another way, that allowed increasing rate of torque is greater when for the regions away from the zero torque region.

In this way, the present invention provides for three different engine increasing torque rate limits depending on the current engine torque value. In particular, when desired engine torque is increasing and a large negative value, it is rate limited at a first value. When desired engine torque is increasing near zero torque point, it is rate limited at a second, generally lower rate. Finally, when desired engine torque is increasing and a large positive value, it is rate limited at a third rate. In addition, any combination of the above three rate limits may be used. For example, engine torque may be limited only when transitioning through the zero torque point, or engine torque may be limited only when transitioning through the zero torque point and when increasing above zero torque, engine torque may be limited only when transitioning through the zero torque point and when increasing below zero torque. Additionally, rate limits can be set as a function of the current, or selected, gear ratio, since different rate limits may be appropriate depending on the actual transmission gear, or based on the selected gear as indicated by the transmission lever (PRNDL). Also, as described herein, rate limiting may be used for decreasing torque when passing through the zero torque region.

From step 1414, the routine continues to step 1422, where a determination is made as to whether the current requested engine torque is greater than the rate limited engine torque. When the answer to this is yes, the desired engine torque is set equal to the rate limited torque and a rate limiting flag (tq_dd_limit) is set to 1. Otherwise, the flag is set to zero in steps 1424 and 1426. From step 1418, the routine continues to step 1428, where the same determination as step 1422 is made. When the answer to step 1428 is yes, the desired engine torque is set equal to the rate limited engine torque and the flag (tq_dd_limit) is set to 2 is step 1430. Otherwise, in step 1432, the flat is set to zero. From step 1420, the same determination as in steps 1422 and 1428 is made in step 1434. When the answer to step 1434 is yes, the desired engine torque is set to equal to the rate limited value and the flag is set to 3 in step 1436. Otherwise, in step 1438, the flag is set to zero.

Figure 15:
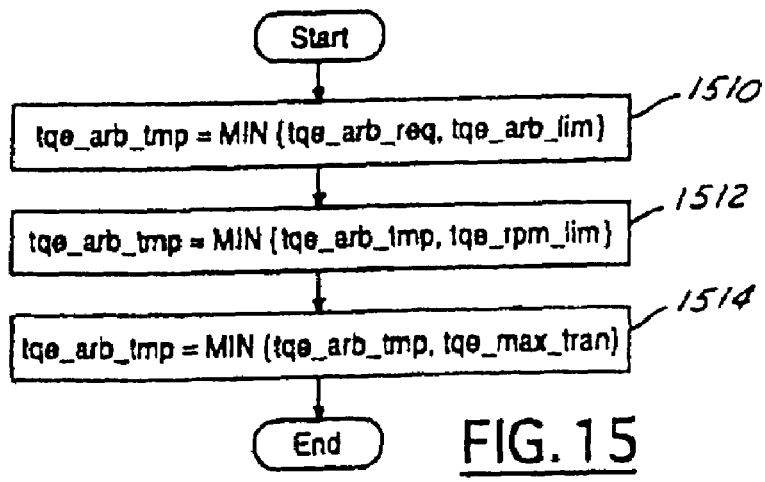

Referring now to FIG. 15, a routine is described for arbitrating between various torque limits and the desired rate limited torque request. In steps 1510, 1512, and 1514, the rate limited desired engine torque request is compared with the various maximum torque limits that prevent engine speed from becoming greater than a predetermined value (tqe_rpm_lim) and which prevent torque being requested which is greater than the maximum allowable torque transmitted through the transmission (tqe_max_tran).

Figure 16A:
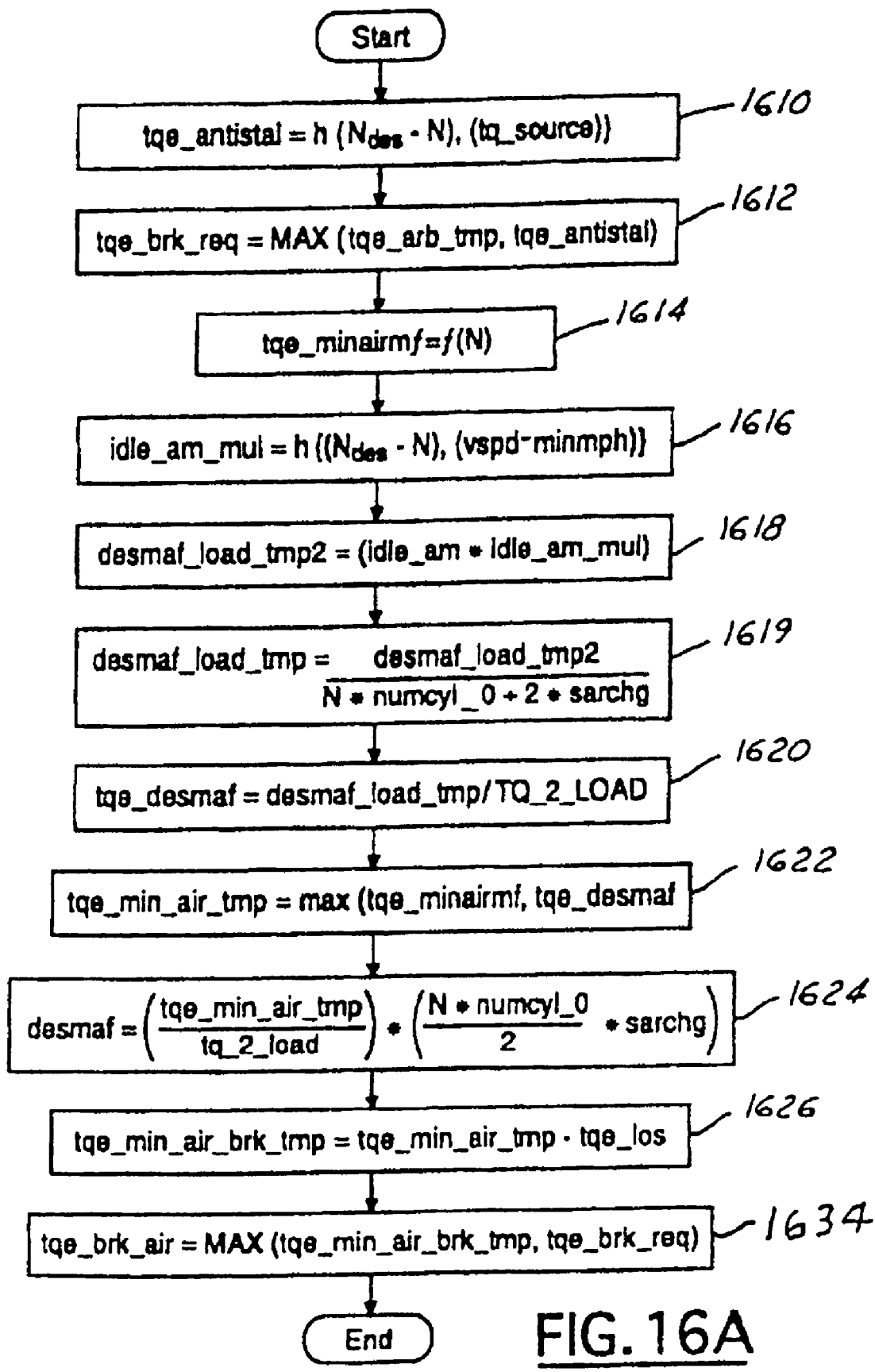
Figures 16B, 16C:
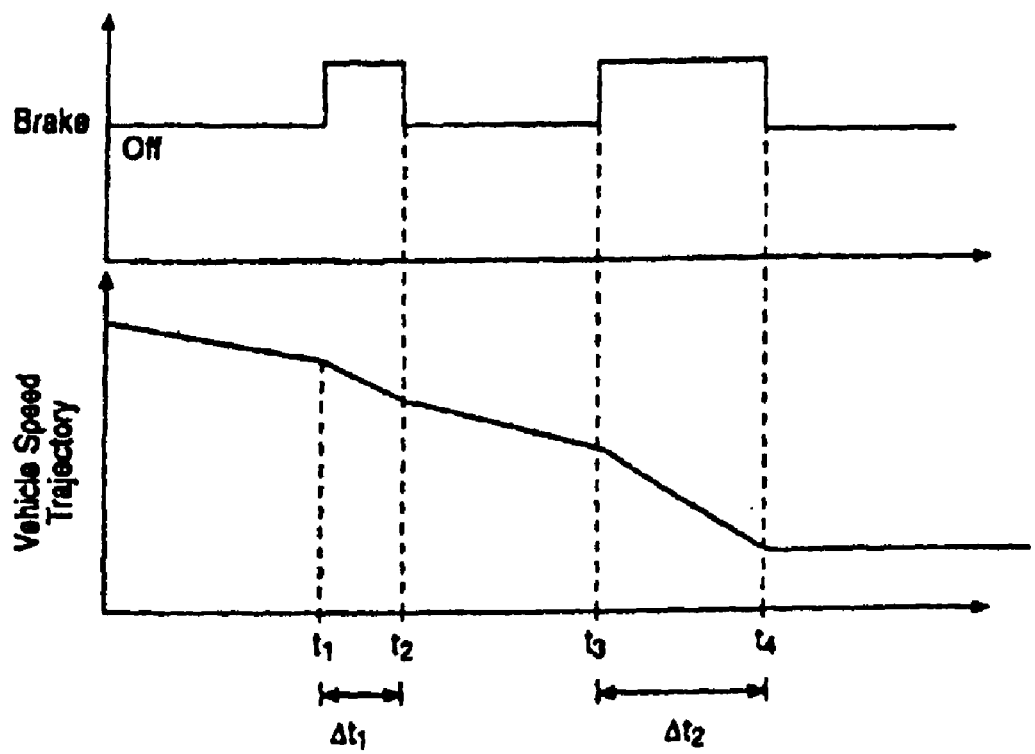

Referring now to FIGS. 16a and 16b, a routine is described for controlling engine torque while maintaining a minimum airflow requirement. In particular, the following routine provides a method to prevent engine stalls when there is a rapid decrease in required engine torque.

First, in step 1610, anti-stall torque line (tqe_antistal) is calculated, which is the minimum indicated torque allowed as a function of engine speed minus desired idle speed and the torque control source (tq_source). Parameter tq_source is the dominant determinant of the torque reduction, i.e., whether vehicle speed limiting, traction control, or shift modulation are limiting torque. Thus, since depending on which limit is controlling, a more aggressive position can be taken on how close to the anti-stall torque line the engine is operated.

Next, in step 1612, the desired engine torque arbitrated request is compared with the anti-stall torque line and the maximum of these parameters is selected. Next, in step 1614, the equivalent indicated engine torque at the minimum allowed airflow and mapped spark value below which engine misfires occur is called. This value is determined as a function of engine speed. Next, in steps 1616 and 1618, the transform of engine required idle airflow is determined. First, a multiplier (idle_am_mul) is determined as a function of the difference between the desired engine speed and the actual engine speed, and the difference between the current vehicle speed and a minimum vehicle speed at which idle speed control is engaged (minmph). FIG. 16c illustrates an example table showing that as the difference in vehicle speed or difference in engine speed becomes smaller, the minimum allowed airflow is gradually adjusted to become equal to the airflow required at idle conditions.

Then, in step 1618, the multiplier is used to adjust the required airflow to maintain a desired engine speed at idle conditions. Then, in step 1619, this adjusted airflow is converted to a load value by dividing by the number of cylinders (numcyl_0), engine speed (N), and the amount of air that fills the cylinder at standard temperature and pressure (sarchg). Next, in step 1620, this desired load is converted to a torque using the conversion factor (TQ_2_LOAD). Finally, in step 1622, the maximum of the torque due to minimum airflow from misfires and the torque due to the minimum air to guarantee engine idle speed control is selected.

Continuing with FIG. 16b, this selected torque is then converted to an airflow request in step 1624. Next, in step 1626, this selected torque request is converted from an indicated torque to an engine brake torque request by subtracting the torque losses (tqe_los). Finally, in step 1634, the engine torque request for scheduling the required airflow for the electronic throttle control system is selected at the maximum of the parameter determined in step 1626 and the current engine brake request.

In this way, according to the present invention, when engine and vehicle operating conditions are away from an idle speed control range, engine airflow can be reduced below the required engine airflow for maintaining idle speed. In this way, it is possible to provide large negative engine brake torques to maintain vehicle trajectory under a variety of vehicle operating conditions. However, as the vehicle conditions approach an engine idle speed region, airflow is increased to a required engine idle speed control level. In this way, even despite the engine airflow delays due to manifold volume, it is possible to maintain robust idle speed control as well as provide large negative engine braking ability.

Figure 17:
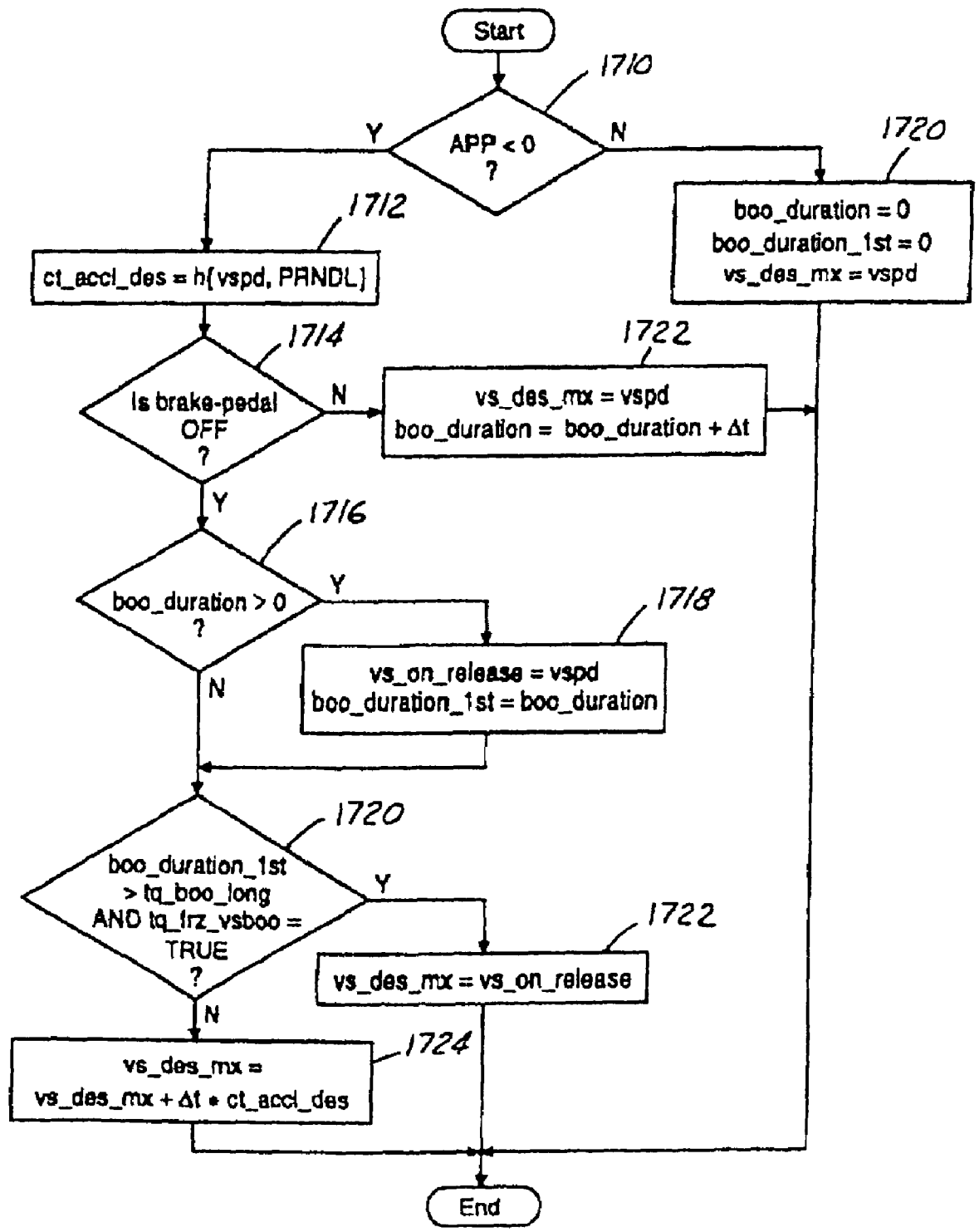

Referring now to FIG. 17, a routine is described for calculating a desired vehicle trajectory, which is called in step 410 of FIG. 4a. First, a determination is made as to whether flag (APP) is less than zero. In other words, a determination is made in step 1710 as to whether a closed pedal (tip-out) condition is present. When the answer to step 17 is yes, the desired closed pedal acceleration (ct_accl_des) is calculated as a function of the current vehicle speed and the gear selected position (PRNDL). Next, in step 1714, a determination is made as to whether the brake pedal is released. When the answer to step 1714 is yes, a determination is made as to whether the brake pedal engagement duration (boo_duration) is greater than zero in step 1716 indicating the first pass through the routine since the brake was depressed. When the answer to step 1716 is yes, the vehicle speed release value (vs_on_release) is set equal to the current vehicle speed and the last brake engagement duration is set equal to the current brake engagement duration value in step 1718. Next, in step 1720, a determination is made as to whether the first brake engagement duration (boo_1st) is greater than a predetermined duration (tq_boo_long) and the flag (tq_frz_vsboo) is true. Flag (tq_frz_vsboo) is a selection flag that allows using brake duration in determining the maximum allowed vehicle speed trajectory.

Parameter (tq_boo_long) represents the braking duration after which the maximum allowed vehicle speed trajectory will be held constant. In other words, if the driver simply taps the brake, the maximum allowed vehicle speed will continue to ramp toward zero after the brake is released. However, if the driver holds the brake pedal for longer than a predetermined value, the maximum allowed vehicle speed is held to the vehicle speed when the brake was released. This can give the driver the ability to set a desired speed using the brake on a long downhill grade.

Continuing with FIG. 17, when the answer to step 1720 is yes, the maximum allowed vehicle speed is set to parameter vs_on_release in step 1722. When the answer to step 1720 is no, the maximum allowed vehicle speed is set to the previously set maximum allowed vehicle speed plus a desired acceleration times the sample time in step 1724. Step 1724 represents where maximum allowed vehicle speed is gradually ramped toward zero.

When the answer to step 1710 is no, the brake engagement duration and the first brake engagement duration are both set to zero and the desired maximum vehicle speed is set to the current vehicle speed in step 1720. When the answer to step 1714 is no, the maximum desired vehicle speed is set to the current vehicle speed and the brake engagement duration is incremented by sample time in step 1722.

In this way, the desired vehicle trajectory is determined based on the current vehicle speed and the position of the gear selector (PRNDL). Further, the desired vehicle trajectory is adjusted based on actuation or engagement of the brake pedal. In particular, the length of engagement of the brake pedal is used to adjust the desired vehicle trajectory. For example, the desired vehicle speed trajectory is decreased while the brake pedal is engaged and set to the value of the actual vehicle speed when the brake pedal is released in some cases. In this way, improved drive performance can be achieved since all parameters indicative of the driver's desired vehicle operation are being incorporated.

Referring now to FIG. 17B, an example of operation is described while the accelerator pedal is released (i.e., closed pedal operation). The top graph shows the brake actuation signal and the bottom graph shows the maximum allowed vehicle speed trajectory. At time t1, the brake is depressed and released at time t2. While the brake is pressed the maximum allowed vehicle speed is set to the current vehicle speed, and thus no control action is taken. Since time difference Δt1 is less than the predetermined brake duration, the ramping of the maximum allowed vehicle speed is then continued until the brake is depressed again at time t3. The brake is then released at time t4. Since time difference Δt1 is greater than the predetermined brake duration, the vehicle speed upon release at time t4 is captured and held as the maximum allowed vehicle speed.

Figure 18:
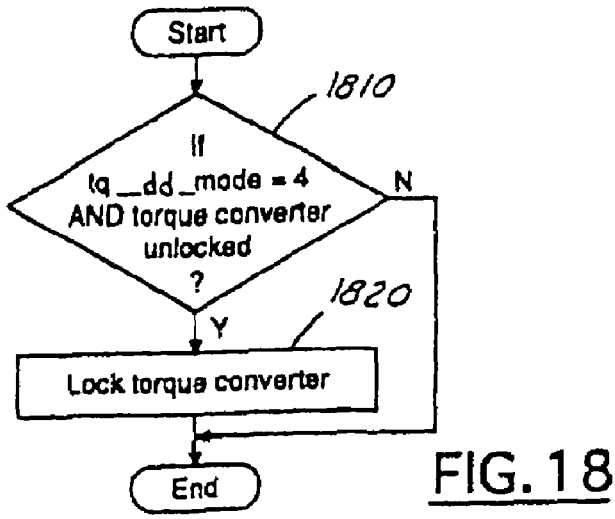

Referring now to FIG. 18, a routine is described for determining, in some cases, whether the torque converter should be locked. In particular, the routine determines whether the torque converter can be locked during a closed pedal operation. First, in step 1810, a determination is made as to whether the state machine is in case 3 and whether the torque converter is presently unlocked. When the answer to step 1810 is yes, the torque converter can be locked in step 1820. In other words, the torque converter can be locked when the engine torque is less than a small, predetermined negative torque value. In other words, the torque converter can be locked after the vehicle has transitioned through the zero torque point. This is especially advantageous if it is desired to unlock the torque converter when the driver again depresses the accelerator pedal and requests positive powertrain output. In particular, under this situation, the torque converter can be unlocked and thus provide a rapid amount of powertrain output, thus improving vehicle performance feel.

Figure 19:
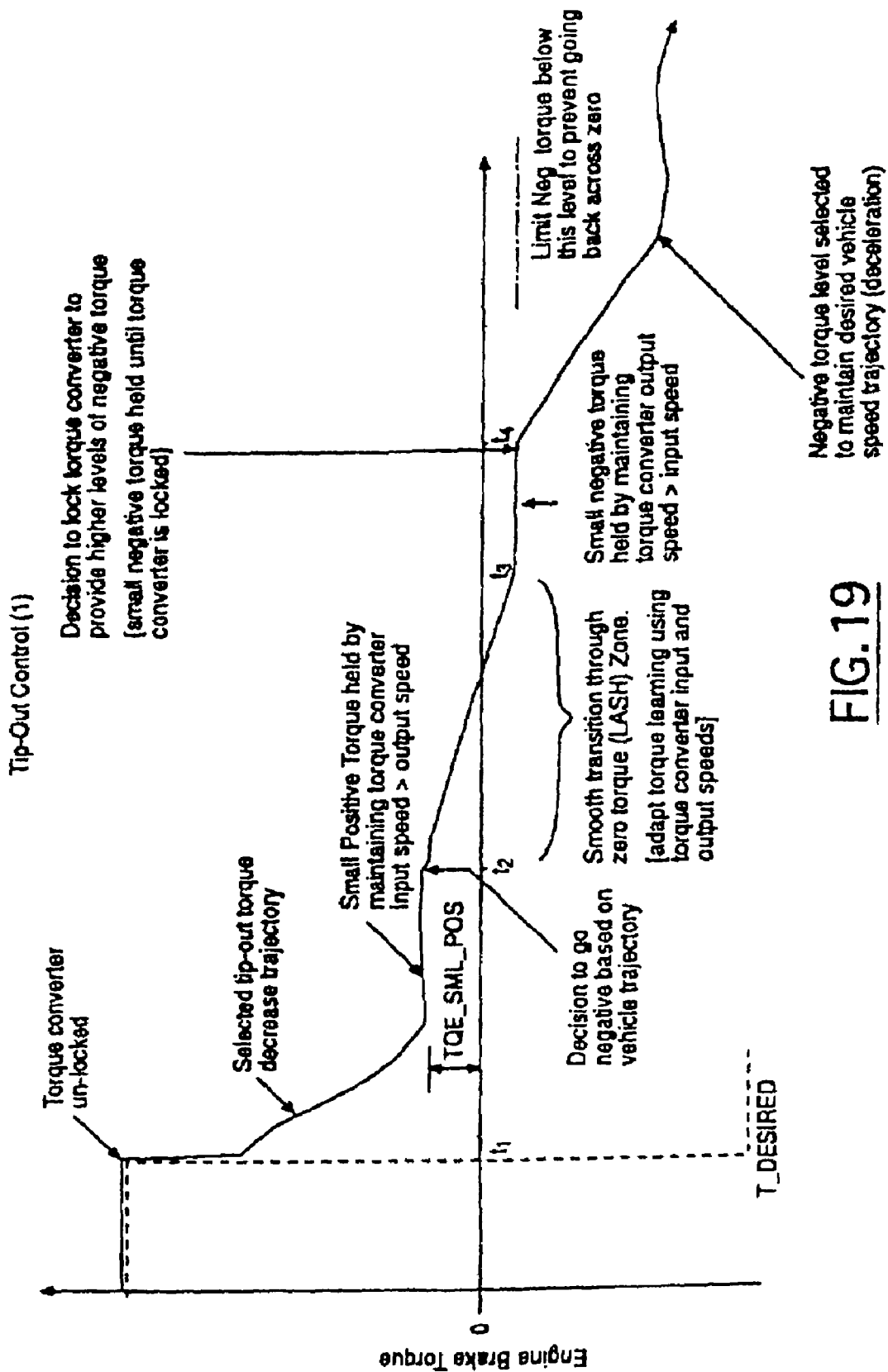
FIG. 19 is a graph illustrating operation according to the present invention.

Referring now to FIG. 19, a graph illustrating typical operation according to the present invention is shown. The graph plots engine brake torque versus time for a tip-out. The dash line illustrates the desired engine torque value determined from, for example, the driver actuated element. The solid line indicates the actual engine torque produced. At time T1, the driver releases the foot pedal and the tip-out situation is begun. The algorithms, according to the present invention as described herein, first reduce the engine torque by a predetermined amount. Then, the engine torque is gradually decreased at a predetermined rate, which is determined by a selected tip-out torque decrease trajectory. The engine torque is decreased until it reaches a small positive value (TQE_SML_POS). Maintaining the torque converter input speed greater than the torque converter output speed holds this small positive torque. Then, at time T2, there is a decision to provide negative engine torque based on the vehicle trajectory. In particular, at time T2, the actual vehicle speed becomes greater than the maximum allowed vehicle speed plus a predetermined calibratable value. Starting at time T2, the engine torque is gradually decreased at a predetermined rate through the zero torque point. Also, in this region, torque line can be used using the torque converter input and output speeds to learn the zero torque point and to update the engine torque model. Then, at time T3, a small negative torque is held by maintaining the torque converter output speed greater than the torque converter input speed. This small negative torque is held for a short period until, at time T4, a decision is made to lock the torque converter to provide high levels of negative torque. At time T4, the torque converter is locked. Then, the negative torque level is selected to maintain the desired vehicle speed trajectory. The negative torque level is selected such that the actual vehicle speed is generally below the maximum allowed vehicle speed.

Figure 20:
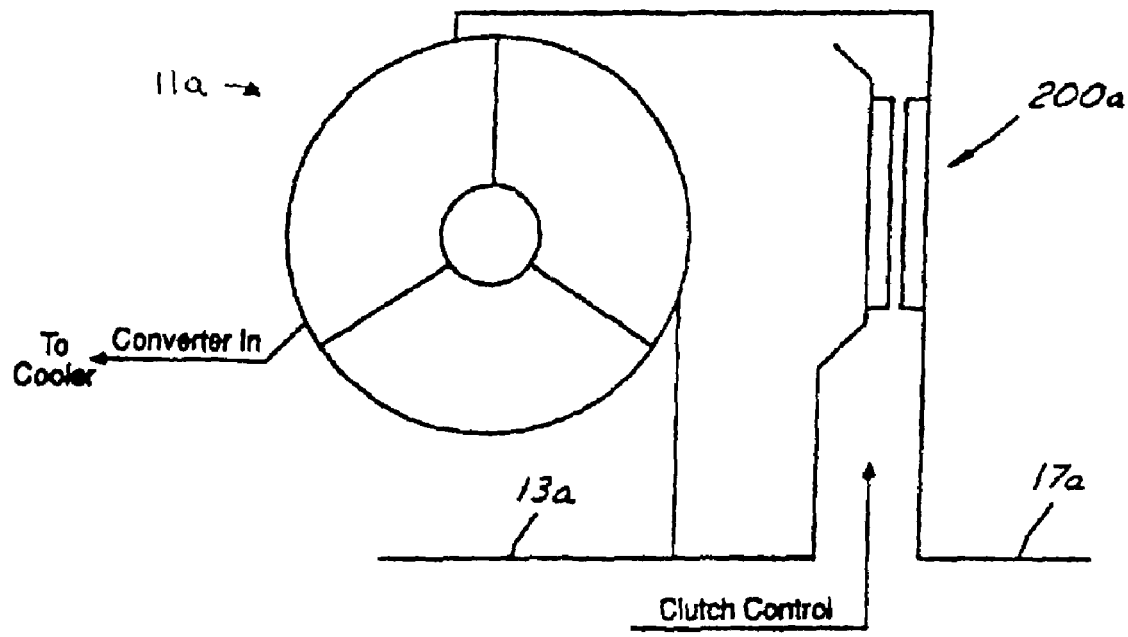
FIGS. 20-23 are block diagrams of torque converters that can be used according to the present invention.
Figure 21:
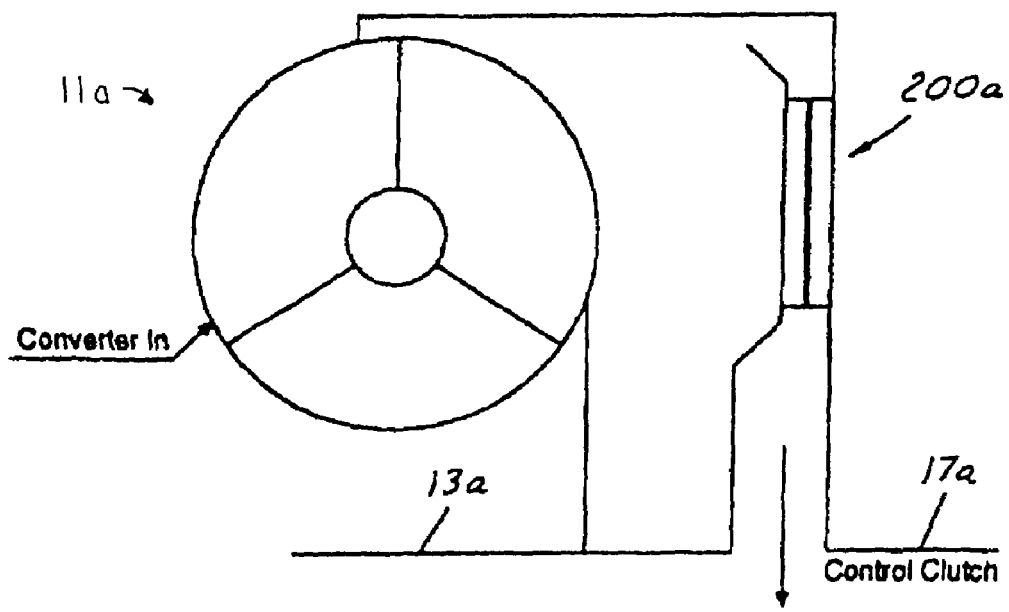

Referring now to FIGS. 20 and 21, two circuit torque converter 11a is shown. FIG. 20 shows the two circuit torque converter clutch disengaged, while FIG. 21 shows the two circuit torque converter clutch engaged. Two circuit torque converter 11a is shown having input shaft 13a, which is coupled to engine crankshaft 13, and output shaft 17a, which is coupled to transmission input shaft 17. Two circuit torque converter 11a has converter clutch 200a. Two circuit torque converter 11a is disengaged by supplying pressure to the clutch control side of the clutch. The pressure is exhausted through the impeller side of the converter. The exhaust fluid is sent to a cooler. In particular, the clutch control pressure must work against the pumping action of the impeller. To apply the converter clutch, fluid flow is reversed.

Figure 22:
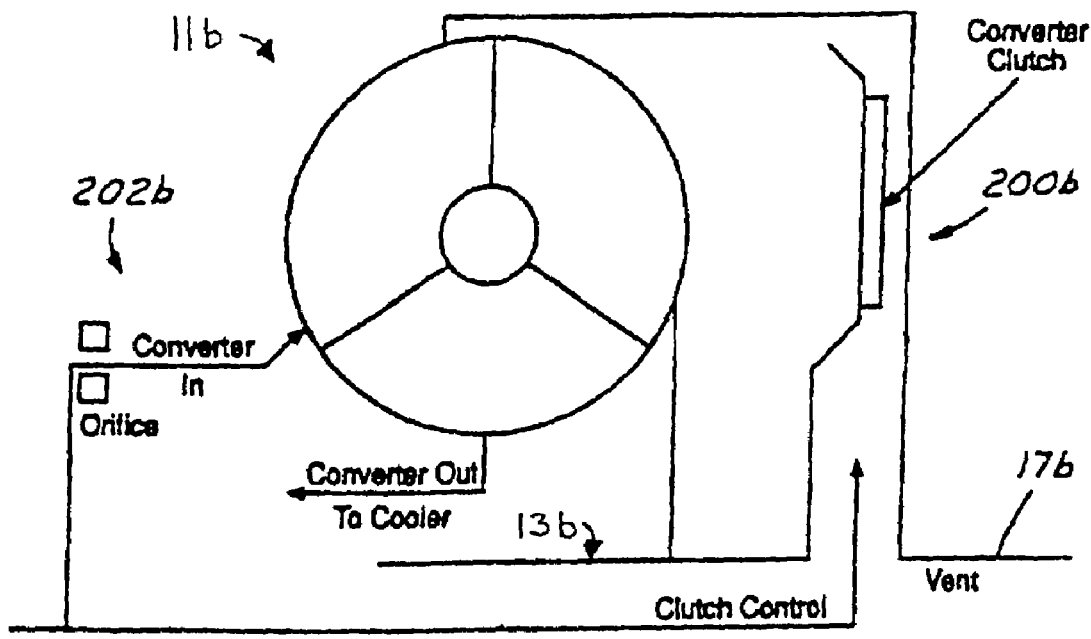
Figure 23:
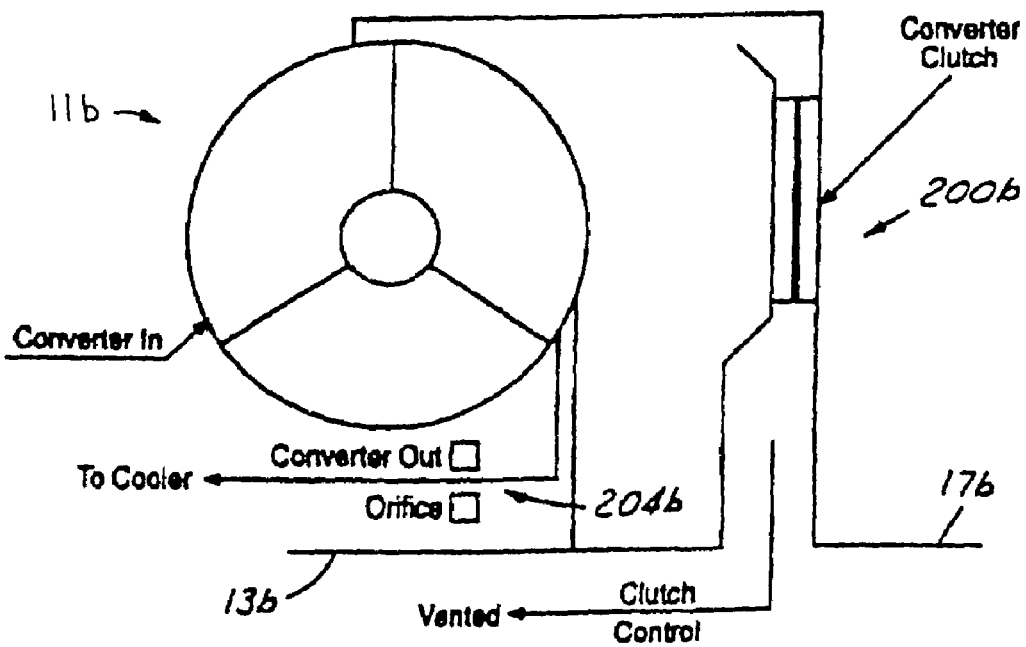

Referring now to FIGS. 22 and 23, three circuit torque converter 11b is shown. FIG. 22 shows the three circuit torque converter clutch disengaged, while FIG. 23 shows the three circuit torque converter clutch engaged. Three circuit torque converter 11b is shows having input shaft 13b, which is coupled to engine crankshaft 13, and output shaft 17b, which is coupled to transmission input shaft 17. Two circuit torque converter 11b has converter clutch 200b. In FIG. 22, fluid is supplied to both the impeller side and to the converter clutch control circuit of the converter; this prevents the clutch from being engaged. The purpose of orifice 202b on the converter inlet side is to reduce the amount of pressure on the converter side of the clutch. The hydraulic pressure in the front chamber becomes greater than pressure in the rear chamber, holding the converter clutch away from the converter cover and releasing lockup. During lock-up mode, in FIG. 23, fluid is allowed to exhaust through the clutch control circuit, thereby allowing the converter clutch piston to apply. Hydraulic pressure in the converter side of the clutch causes the converter clutch to press tightly against the converter cover. Lock-up occurs, and power is transmitted directly to transmission 15 with no fluid slippage. Converter in oil is fed directly, without an orifice. Converter output is restricted by orifice 204b to ensure the pressure builds up on the converter side of the lockup clutch.

The inventors of the present invention have found that torque converter 11a is more difficult to lock when transmitting large negative torque (impeller spinning much slower than turbine) than torque converter 11b. A potential explanation of this is that when the impeller is spinning slower than the turbine, the turbine is pushing oil into the impeller, rather than the other way. It is then hard to build pressure on the turbine side to push the clutch on.

However, those skilled in the art will recognize, in view of this disclosure, that the method of the present invention is not limited to two circuit torque converters. In particular, this aspect of the present invention is applicable to any torque converter that would be difficult to lock when transmitting large negative torque values. For example, this difficulty may be due to inability to build hydraulic pressure or inability to exhaust hydraulic pressure. Typically, this type of torque converter has insufficient hydraulic pressure to be locked when transmitting a predetermined amount of negative torque. This predetermined amount of negative torque can be determined using torque converter input and output speeds. For example, when output speed is greater than input speed by a predetermined amount, the torque converter has insufficient hydraulic pressure to be locked.

Further, the inventors have recognized that it is possible to minimize "clunk" by providing an un-locked torque converter when passing through the zero torque point (or transmission lash zone). And, at the same time, provide maximum availability of negative powertrain torque with a locked torque converter by locking the torque converter after transitioning through the lash zone.

What is claimed is:

1. A system, comprising:
   an engine having an electronically controlled throttle plate to adjust airflow to the engine;
   a transmission having an input speed and an output speed, the transmission including a clutch and the transmission coupled to the engine; and
   a controller configured to:
   during a tip-out condition and during a gear ratio change to a future gear, and when the transmission does not provide engine braking, control the engine speed to a synchronous speed in the future gear ratio by adjusting an engine operating parameter so that the engine speed is close to the engine speed that will be achieved after the gear change is completed, and maintain engine speed at the close engine speed after the gear change is completed until a tip-in, where engine speed is controlled by adjusting at least the electronically controlled throttle plate.

2. The system of claim 1 wherein said synchronous speed is a synchronous transmission input speed.

3. A system, comprising:
   an engine having an electronically controlled throttle plate to adjust airflow to the engine;
   a transmission having an input speed and an output speed, the transmission coupled to the engine; and
   a controller configured to:
   during a closed pedal condition and during a manual gear ratio change to a future gear, control the engine speed to a synchronous speed in the future gear ratio by adjusting an engine operating parameter so that the engine speed is close to the engine speed that will be achieved after the gear change is completed, and maintain the engine speed at the synchronous speed after the shift to the future gear until a driver tip-in to provide a reduced-delay wheel torque output increase in response to the tip-in, where engine speed is controlled by adjusting the electronically controlled throttle plate.

4. The system of claim 3 wherein said synchronous speed is a synchronous transmission input speed.

5. A system, comprising:
   an engine having an electronically controlled throttle plate to adjust airflow to the engine;
   a transmission having an input speed and an output speed, the transmission coupled to the engine; and
   a controller configured to:
   during a closed pedal condition and when the transmission does not provide engine braking, control the engine speed to a synchronous speed, where the synchronous speed is based on a transmission gear state, where the engine speed is maintained at the synchronous speed until positive powertrain output is applied; and when positive powertrain output torque is again applied, provide said powertrain output torque without delay and with engine speed increasing from the synchronous speed, where engine speed is controlled by adjusting the electronically controlled throttle plate.

* * * * *